J. F. COPPOCK.
RUNNING-GEAR.

No. 173,111. Patented Feb. 8, 1876.

WITNESSES: INVENTOR.

UNITED STATES PATENT OFFICE.

JOHN F. COPPOCK, OF WEST NEWTON, ASSIGNOR OF ONE-HALF HIS RIGHT TO WILLIAM C. SWINDLER, OF BELLEVILLE, INDIANA.

IMPROVEMENT IN RUNNING-GEARS.

Specification forming part of Letters Patent No. 173,111, dated February 8, 1876; application filed November 24, 1875.

*To all whom it may concern:*

Be it known that I, JOHN F. COPPOCK, of West Newton, Marion county, State of Indiana, have invented certain new and useful Improvements in Running-Gears of Vehicles, of which the following is a description, reference being had to the accompanying drawings.

My invention consists in the construction and arrangement of devices attached to the axles of a vehicle, so arranged and operated that any movement of the front axle on its king-bolt in any direction, as in turning around, is followed by a corresponding movement of the rear axle in the opposite direction, thereby throwing both axles out of line, and causing the wheels to run in a circular track, which will allow the vehicle to turn in less space than if the rear axle were stationary.

Figure 1:
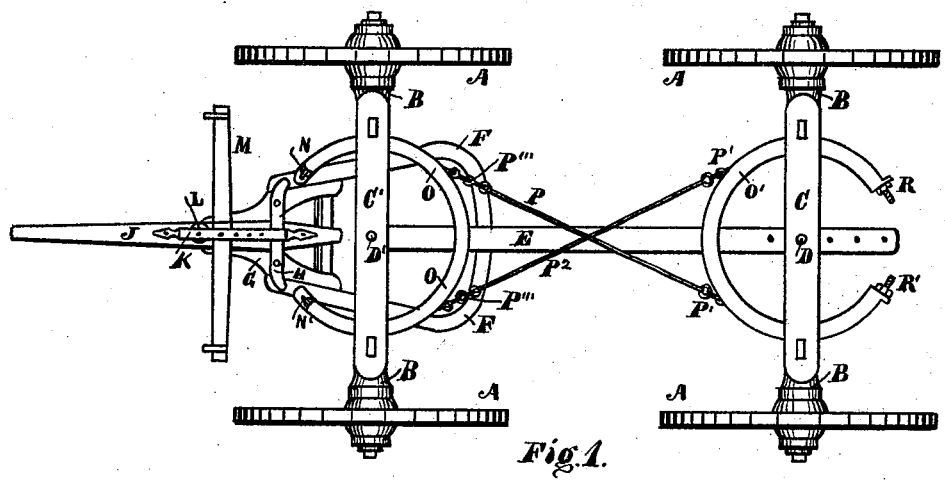
Figure 2:
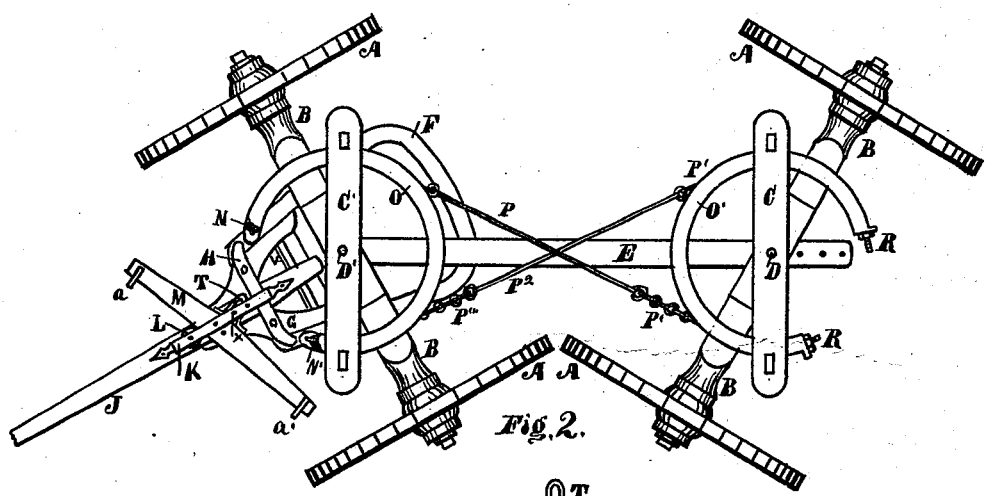
Figure 3:
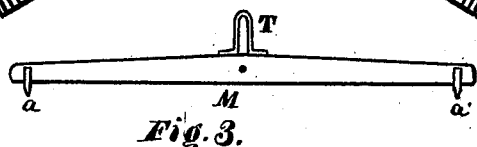

Figure 1 represents a plan view of a vehicle embodying my improvement, with the wheels in line with each other. Fig. 2 is a plan view of the same, showing the wheels out of line, as in turning a curve. Fig. 3 is a view of the double-tree.

A represents the wheels, mounted on the axles B in the usual manner. The axles are united together by the coupling-pole E, which is pivoted to each axle by the king-bolts D D'. Above each axle B, and secured thereto, are the segmental sheaves O O'. The sheave O', on the rear axle, is provided at each end R R' with a plate, through which the adjustable screws on the ends of the chains P¹ P¹ pass, with a nut on each screw. The sheave O, on the front axle, is secured to the axle B and the hounds F, and the chains P''' P''' are secured to hooks N N' on the ends of the segmental sheave O, or on the ends of the hounds F, as may be required. The chains P''' P''' and P¹ P², are united by the cross-rods P P², and the slack in each is taken up at R R' by means of the nuts and screws on the ends of the chains P¹ P¹.

By this arrangement, it will be seen that any movement of the front axle out of a straight line, as in turning a curve, communicates a reverse motion to the rear axle, which will allow the vehicle to turn in less space than would be required if the rear axle were stationary, which is of great value.

The tongue J is secured to the hounds G, which are in turn pivoted to the hounds F in the usual manner, by the pivot-bar V. The top of the tongue J and hounds G are provided with a bar or cleat, H, which prevents the front end of the tongue from falling to the ground, but does not prevent the end of the tongue from being lifted up. On the top of the tongue J, near its rear end, is a strap of iron, K, secured at each end to the tongue by bolts. Between this strap and the tongue is the double-tree M, which is made in the usual manner, except that it is provided with a loop, T, on its rear side, near the center, through which the pin $x$ is inserted after passing through the strap K, as shown in Fig. 2. Immediately in front of the double-tree M, and pivoted between the strap K and tongue J, is a friction-roller, L, on which all of the draft of the horses is placed.

By this arrangement, the position of the fulcrum on the double-tree is varied in such a manner as to allow the weakest horse to have leverage against the strongest horse, because the horse that is strongest will pull ahead; consequently the double-tree on his side will be drawn ahead, and the pin $x$ in the loop T will allow the double-tree to move sidewise, thus drawing the end that has been drawn ahead closer to the tongue, thus giving the weakest horse the advantage of the longest end of the double-tree, to equalize the draft.

I do not claim the turning of the rear axle in an opposite direction to that of the front axle, for the purpose of allowing the vehicle to be turned in small curves, as that is old.

What I claim as new, and wish to secure by Letters Patent, is—

1. The segmental sheaves O O', constructed as described, and attached to the axle, sand-boards, or hounds of a vehicle, substantially as set forth and described, for the purpose specified.

2. The chains P¹ P¹, in combination with the adjusting screws and nuts R R', and segmental sheave O', substantially as and for the purpose set forth and described.

3. The chains P''' P''', in combination with the hooks N N' on the ends of the sheave O, hounds, or axle, and segmental sheave O, substantially as set forth and described.

4. The combination of the chains P''' P¹, rods P, screws and nuts R, and segmental sheaves O O', substantially as and for the purpose set forth and described.

In testimony whereof I have signed my name to this specification in the presence of two subscribing witnesses.

JOHN F. COPPOCK.

Witnesses:
DAVID GIBBENS,
WM. SWINDLER.